(12) United States Patent
Liu et al.

(10) Patent No.: US 10,886,814 B2
(45) Date of Patent: Jan. 5, 2021

(54) METHODS AND SYSTEMS FOR STATOR COOLING

(71) Applicant: GALATECH, INC., Milpitas, CA (US)

(72) Inventors: Wenjun Liu, Santa Clara, CA (US); Robert James Ramm, Mountain View, CA (US)

(73) Assignee: GALATECH, INC., Milpitas, CA (US)

( * ) Notice: Subject to any disclaimer, the term of this patent is extended or adjusted under 35 U.S.C. 154(b) by 247 days.

(21) Appl. No.: 15/974,569

(22) Filed: May 8, 2018

(65) Prior Publication Data

US 2019/0348889 A1    Nov. 14, 2019

(51) Int. Cl.
| | |
|---|---|
| *H02K 9/19* | (2006.01) |
| *H02K 1/20* | (2006.01) |
| *H02K 5/20* | (2006.01) |
| *H02K 15/02* | (2006.01) |
| *B60L 3/00* | (2019.01) |
| *B60L 1/00* | (2006.01) |
| *H02K 1/12* | (2006.01) |

(52) U.S. Cl.
CPC .............. *H02K 5/20* (2013.01); *B60L 1/003* (2013.01); *B60L 3/0061* (2013.01); *H02K 1/12* (2013.01); *H02K 1/20* (2013.01); *H02K 9/19* (2013.01); *H02K 15/024* (2013.01); *B60L 2220/46* (2013.01); *B60L 2220/50* (2013.01); *B60L 2240/425* (2013.01)

(58) Field of Classification Search
CPC ......... H02K 5/20; H02K 15/024; H02K 9/19; H02K 1/12; H02K 1/20; B60L 3/0061; B60L 1/003; B60L 2220/50; B60L 2240/425; B60L 2220/46; B60K 1/00

USPC ............... 310/58, 59, 216.011, 216.014
See application file for complete search history.

(56) References Cited

U.S. PATENT DOCUMENTS

| | | | |
|---|---|---|---|
| 4,736,516 A | 4/1988 | Pfaffenzeller et al. | |
| 8,082,654 B2 | 12/2011 | Bender | |
| 8,141,233 B2 | 3/2012 | Malvestiti et al. | |
| 2009/0224626 A1 | 9/2009 | Eppler et al. | |
| 2013/0002058 A1* | 1/2013 | McIntosh | H02K 1/185 310/43 |
| 2016/0226327 A1* | 8/2016 | Rippel | H02K 9/19 |
| 2016/0380490 A1* | 12/2016 | McClelland | H02K 1/16 310/58 |

OTHER PUBLICATIONS

GALATECH Inc., International Search Report / Written Opinion, PCT/US2019/030867, dated Jul. 19, 2019, 8 pgs.

* cited by examiner

*Primary Examiner* — Thomas Truong
(74) *Attorney, Agent, or Firm* — Morgan, Lewis & Bockius LLP

(57) ABSTRACT

A method of fabricating a stator for an electric motor is provided. The method includes providing a plurality of stator laminations. Each stator lamination of the plurality of stator laminations is a copy of the same stator lamination pattern. The method further includes stacking the plurality of stator laminations in a sequence along an axis, comprising periodically varying rotational orientations of the stator laminations in the sequence. The method further includes joining the plurality of stator laminations as stacked in the sequence.

16 Claims, 11 Drawing Sheets

METHODS AND SYSTEMS FOR STATOR COOLING

TECHNICAL FIELD

This relates generally to powertrains for electric vehicles, including a motor of an electric vehicle having a stator and a rotor and methods and systems for cooling the stator.

BACKGROUND

The powertrain of an electric vehicle includes a battery, an inverter, a motor, and a gearbox. The motor of an electric vehicle typically includes a rotor and a stator. The efficiency of the motor is based in part on maintaining a cool temperature of the stator.

SUMMARY

In some implementations, a method of fabricating a stator for an electric motor includes providing a plurality of stator laminations and stacking the plurality of stator laminations in a sequence along an axis. Each stator lamination of the plurality of stator lamination is a copy of the same stator lamination pattern. The stacking comprises periodically varying rotational orientations of the stator laminations with respect to the axis. The method further includes joining the plurality of stator laminations as stacked in the sequence.

In some implementations, an electric motor includes a rotor having a rotor shaft disposed along an axis of the rotor and a stator that includes a plurality of stator laminations stacked coaxially with the rotor shaft in a sequence. Each stator lamination of the plurality of stator laminations is a copy of the same stator lamination pattern. The stator laminations have periodically varying rotational orientations of the stator laminations in the sequence.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the drawings and specification. Like fill patterns indicate corresponding parts throughout the drawings.

DETAILED DESCRIPTION

In some implementations, an electric motor includes a rotor and a stator. The stator includes a plurality of stator laminations. The stator laminations are all produced using the same pattern. These stator laminations can be stamped, using the pattern, from an iron alloy material with a thickness of, for example, 0.25-0.35 mm. Thus, each stator lamination has two faces (front and back) and an edge. The stator laminations are stacked face-to-face to create the stator. Each stator lamination in the stack is electrically isolated from the other stator laminations in the stack to avoid eddy current loss. To cool the stator, a cooling fluid (such as oil) is pumped through channels along the stack.

However, when the stator laminations are stacked in the same manner (e.g., one on top of the next, with no rotation between them), the oil in the channels passes over only the edge of each stator lamination and thus interacts with only a small surface area of each stator lamination, resulting in inefficient cooling.

Some implementations described herein solve this problem by rotating stator laminations relative to each other (e.g., rotating the stator laminations by 180 degrees about the axis of the rotor or flipping the laminations over with respect to one another). The stator lamination pattern is designed such that, when stacked in this manner, the stator laminations create channels as wells as regions in which the cooling fluid is forced against portions of the faces of the stator laminations. This is achieved, for example, by having fins that are stacked alternately relative to one another, or by having overlapping apertures that are stacked alternately relative to one another.

The increased surface area provided by the portions of the faces of the stator laminations with which the cooling fluid interacts results more efficient cooling, which in turn increases the efficiency of the electric motor.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Figure 1A:
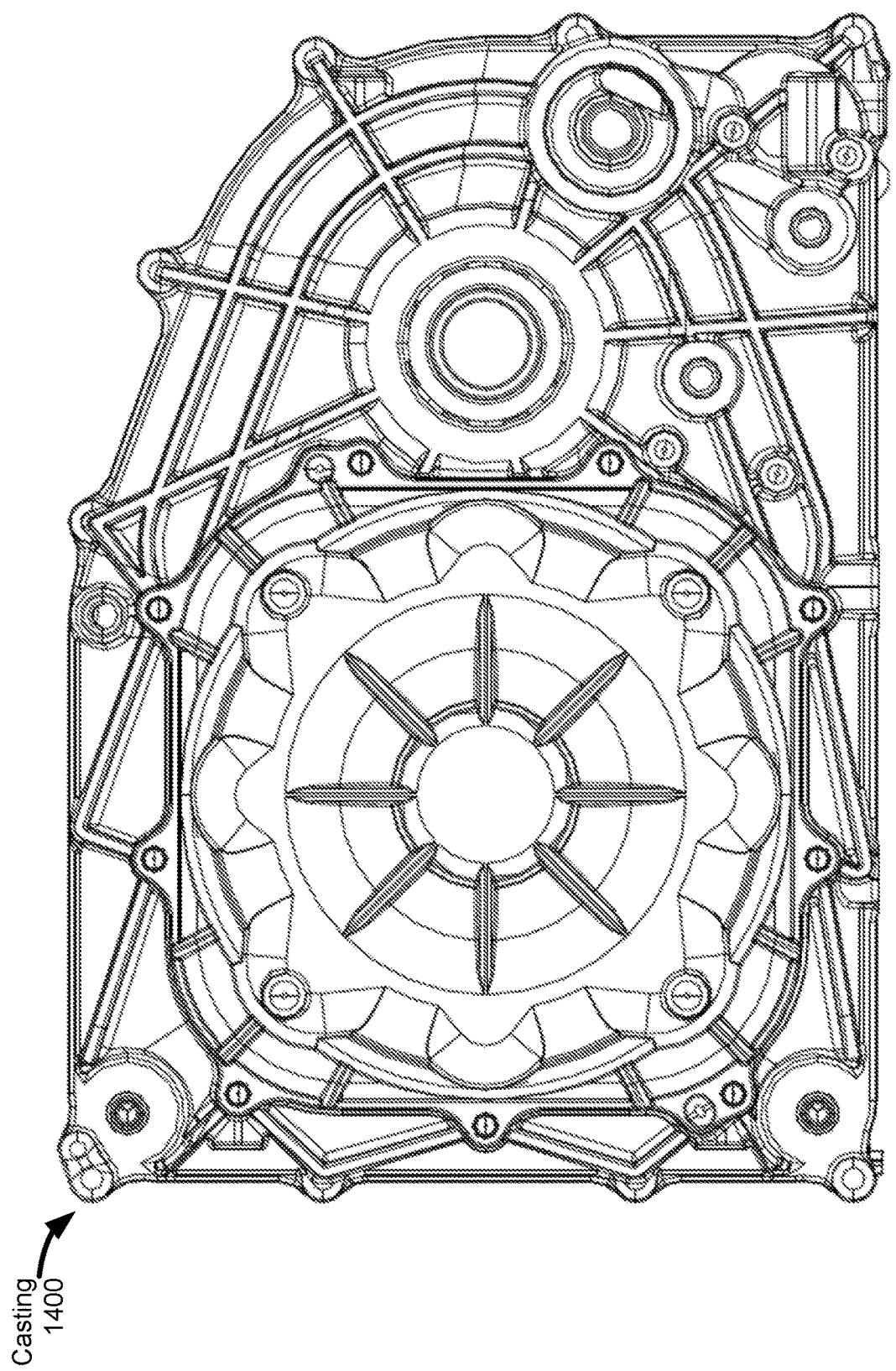
FIGS. 1A, 1B and 1C are views of a casting of an electric vehicle, in accordance with some implementations.
Figure 1B:
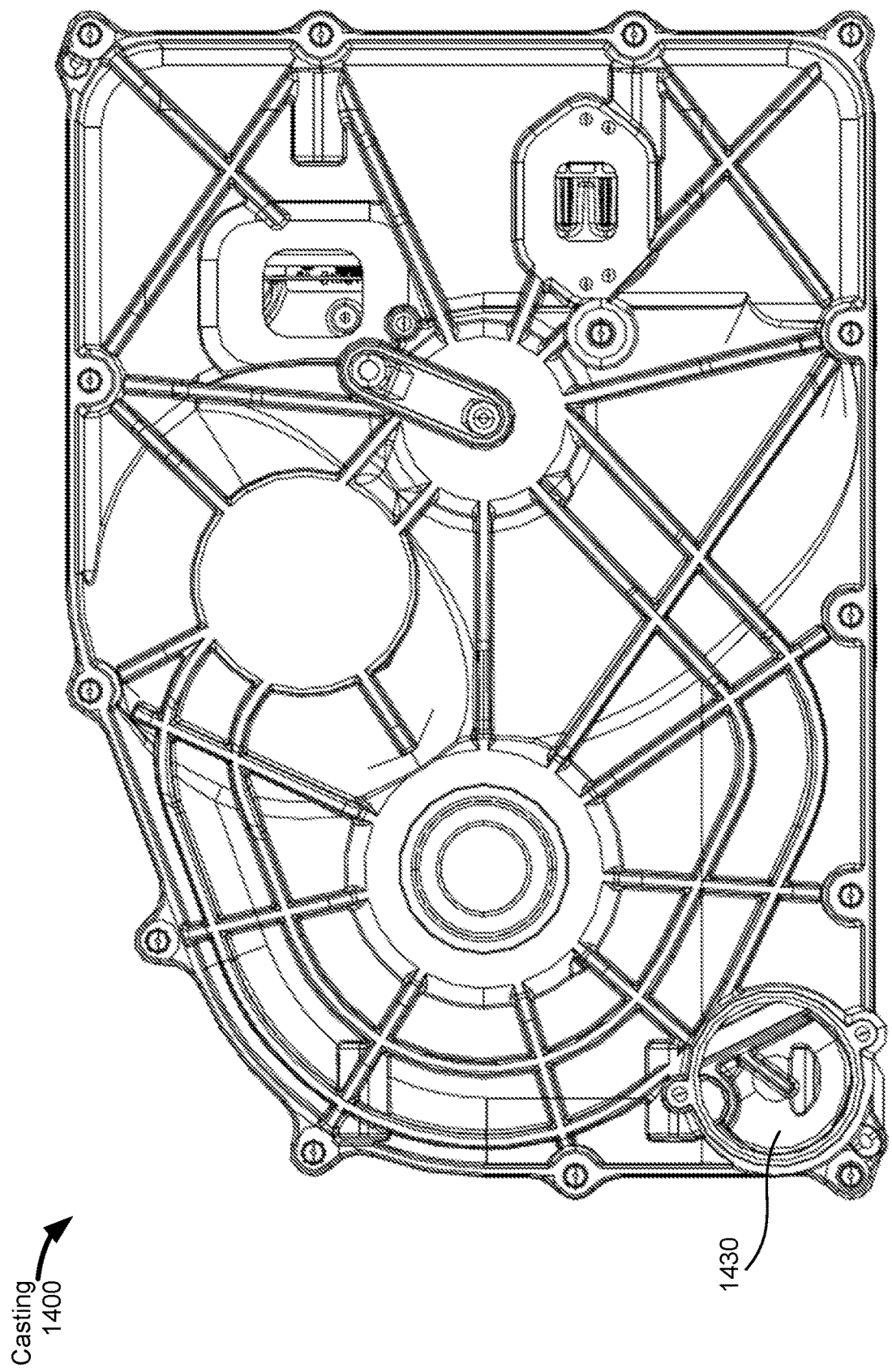
Figure 1C:
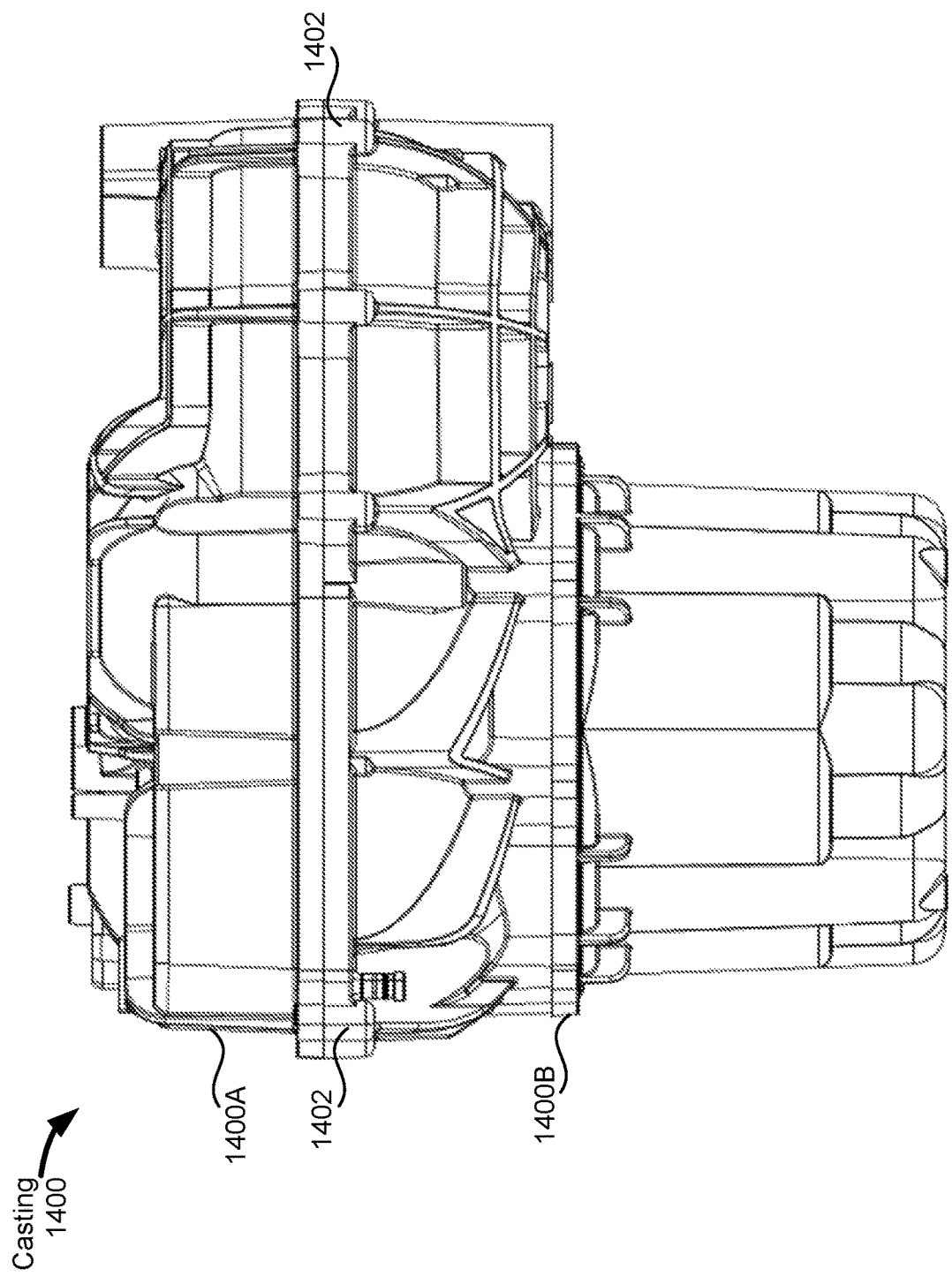
Figure 2:
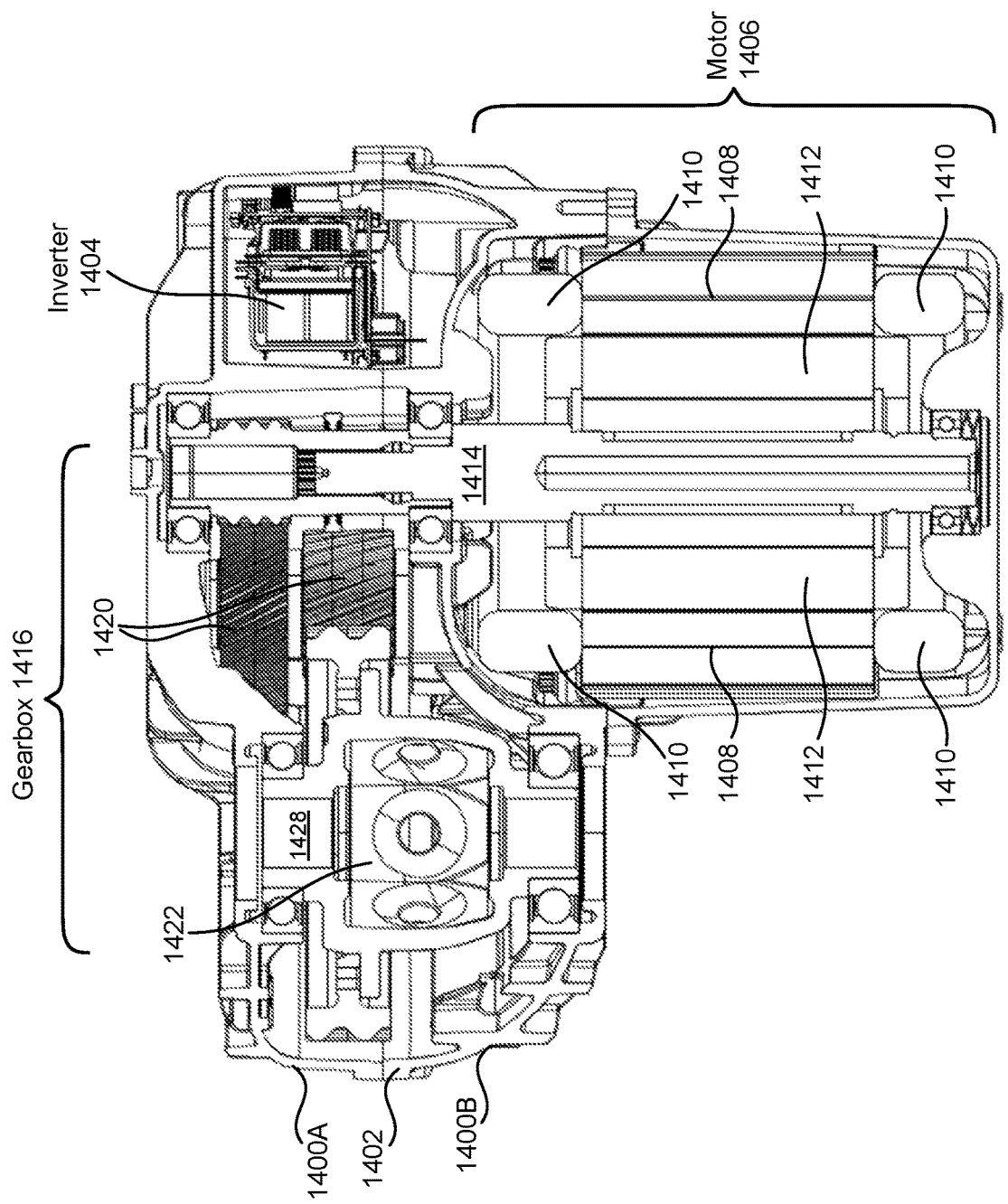
FIG. 2 is a cross-sectional view showing components within the casting, in accordance with some implementations.

FIGS. 1A-1C are views of a casting 1400 for an electric vehicle in accordance with some implementations. The side view of FIG. 1B is opposite to the side view of FIG. 1A. In some implementations, the casting houses an electric motor, gearbox and/or an inverter. As shown in FIGS. 1C and 2, the casting 1400 may include a first portion 1400A and a second portion 1400B that are joined (e.g., bolted together) using bosses 1402 (FIG. 1B and FIG. 2) during assembly, to encase components within the casting 1400. The casting 1400 may be manufactured by die casting and may be aluminum. FIG. 1B illustrates oil pump 1430 in a lower corner of the casting such that an oil loop is created to cool the motor (e.g., motor 1406). In some implementations, the oil loop geometry (e.g., including the location of the oil pump to the inlet of the stator) is independent of the drive unit angle (e.g., the angle at which the drive unit is installed).

FIG. 2 is a cross-sectional view showing components within the casting 1400 in accordance with some implementations. These components include an inverter 1404, electric motor 1406, and gearbox 1416. The inverter 1404 receives DC power from a battery external to the casting 1400 and converts the DC power to AC power, which is provided to the motor 1406. The motor 1406 includes a rotor 1412 disposed at least partially within a stator 1408. In some implementations, the stator 1408 includes a plurality of stator laminations (e.g., as described with reference to FIGS. 5-9) stacked coaxially with a rotor shaft 1414 in a sequence (e.g., along an axis about which the rotor 1412 and the rotor shaft 1414 rotate). The stator 1408 has associated stator windings 1410, to which the AC power from the inverter 1404 is provided, at both ends. The stator windings 1410 are thus electrically coupled to the output (e.g., phase-out bus bars) of the inverter 1404; in this manner, the inverter 1404 is coupled to the motor 1406 to provide the AC power to the motor 1406. The rotor shaft 1414 extends beyond one end of the stator 1408. The gearbox 1416 includes a gear 1418 (FIG. 3) on the rotor shaft 1414, intermediate gearing 1420, and a final gear 1422 (e.g., a differential gear). The intermediate gearing 1420 couples the rotor shaft 1414 with the final gear 1422. The rotor shaft 1414 is situated between the inverter 1404 and components of the gearbox 1416, including the intermediate gearing 1420 and final gear 1422 but excluding the gear 1418, as shown. A portion of the intermediate gearing 1420 (e.g., a portion of the gear 1424, FIG. 3), however, may overlap the rotor shaft 1414, as shown.

Figure 3:
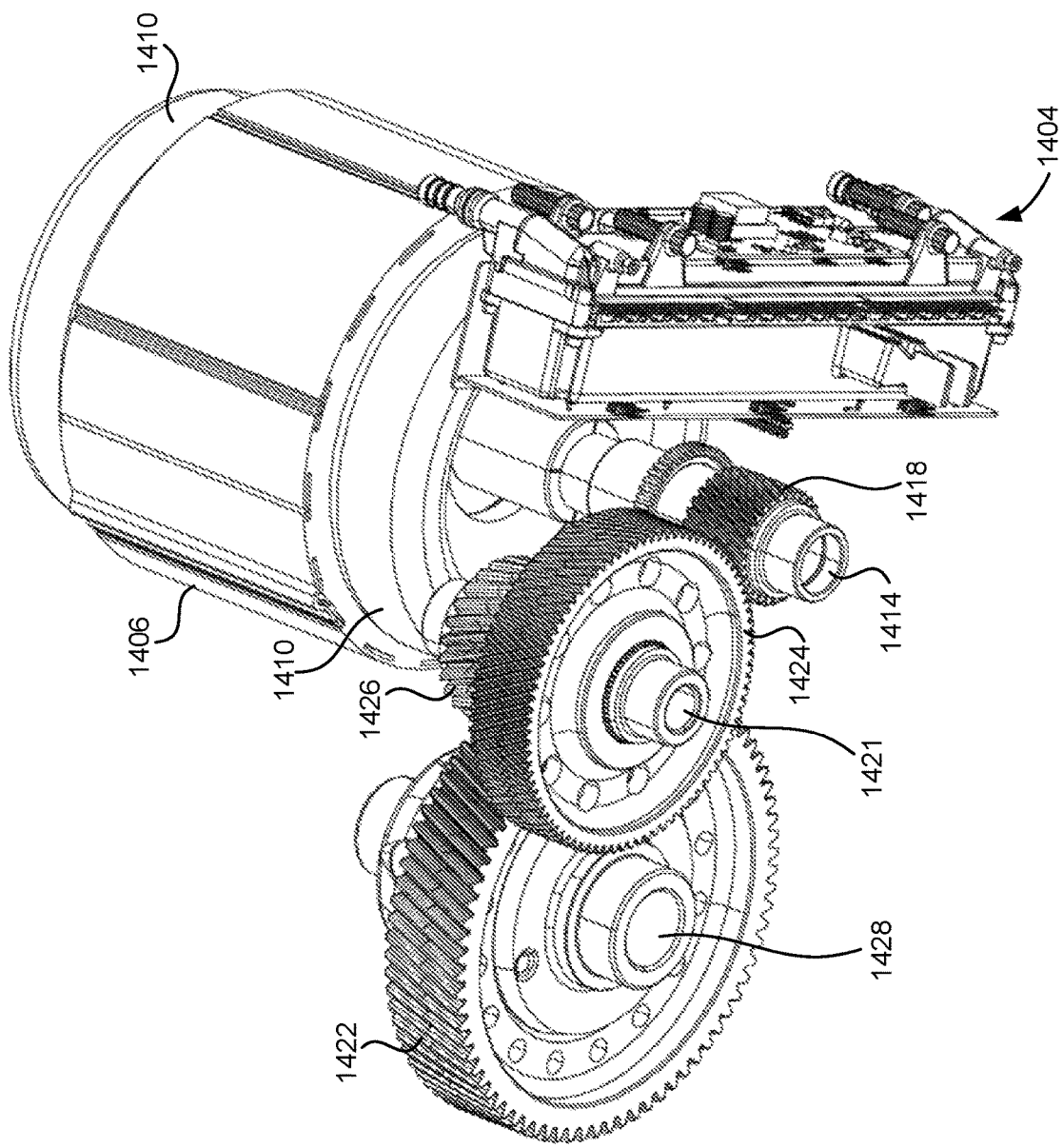
FIG. 3 is a perspective view of components within the casting, but with the casting omitted for visual clarity, in accordance with some implementations.

FIG. 3 is a perspective view of components within the casting 1400 situated at their positions within the casting 1400, but with the casting 1400 omitted for visual clarity, in accordance with some implementations. The gear 1418 is axially mounted on the rotor shaft 1414 (i.e., the gear 1418 is connected to and concentric with the rotor shaft 1414). The intermediate gearing 1420 (FIG. 2) includes gears 1424 and 1426 mounted axially and spaced apart on a shaft 1421 (i.e., the gears 1424 are connected to, concentric with, and spaced apart on the shaft 1421). The shaft 1421 is situated on a side of the rotor shaft 1414 opposite to the inverter 1404 (i.e., the inverter 1404 is on a first side of the rotor shaft 1414 and the shaft 1421 is on a second side of the rotor shaft 1414 opposite to the first side; these sides may be defined as opposite sides of a plane passing through the rotor shaft 1414, such as the plane corresponding to the center line of the rotor shaft 1414 shown in FIG. 3). The gear 1424 engages with the gear 1418 (i.e., teeth of the gear 1424 engage with teeth of the gear 1418). The gear 1426 engages with the final gear 1422 (i.e., teeth of the gear 1426 engage with teeth of the gear 1422). The final gear 1422 may be connected to an axle 1428, such that the gearbox 1416 allows the motor 1406 to rotate the axle 1428 and thereby provide drive. The axle 1428 is situated on a side of the rotor shaft 1414 opposite to the inverter 1404 (i.e., the inverter 1404 is on a first side of the rotor shaft 1414 and the axle 1428 is on a second side of the rotor shaft 1414 opposite to the first side; these sides may again be defined as opposite sides of a plane passing through the rotor shaft 1414, such as the plane corresponding to the center line of the rotor shaft 1414 shown in FIG. 3).

A method of fabricating a stator (e.g., stator 1408) for an electric motor (e.g., motor 1406) is provided. In some implementations, the method includes providing a plurality of stator laminations. Each stator lamination of the plurality of stator laminations is a copy of the same stator lamination pattern (e.g., stator lamination pattern 400 shown in FIG. 4 or stator lamination pattern 700 shown in FIG. 7). For example, using the same stator lamination allows for efficient manufacturing without increasing cost.

In some implementations, each stator lamination in the stack is electrically isolated from the other stator laminations in the stack to avoid eddy current loss. In some implementations, the stator is fabricated to allow cooling of the stator temperature.

In some implementations, the method further includes stacking the plurality of stator laminations in a sequence along an axis, including periodically varying rotational orientations of the stator laminations in the sequence. For example, the stator 1408 may include a plurality of stator laminations stacked on top of each other. In some implementations, while varying the rotational orientations of the stator laminations in the sequence, the slots (e.g., slots 412 or slots 712) of each stator lamination of the plurality of stator laminations remain aligned with the slots of successive stator laminations in the stack. In some implementations, each stator lamination of the plurality of stator laminations is manufactured by stamping the same stator lamination pattern and assembling the plurality of stator laminations by alternating the positioning of the laminations (e.g., using openings 410 and 710, discussed below).

It should be noted, however, that in some implementations, the method includes providing and stacking additional stator laminations beyond that plurality of stator laminations (e.g., besides those that are manufactured by stamping the same stator lamination pattern and assembling the plurality of stator laminations by alternating the positioning of the laminations).

In some implementations, each stator lamination has a thickness between 0.25-0.35 mm. In some implementations, over 400 stator laminations are stacked in order to form the stator. The total number of stator laminations in the stack and the thickness of each lamination may vary based on manufacturing tolerances. In some implementations, the stator laminations are made of an iron alloy material. In some implementations, the stator laminations are made of iron or aluminum.

In some implementations, periodically varying the rotational orientations includes alternating the rotational orientations of successive stator laminations in the sequence by 180 degrees. For example, a stator lamination aligned in the first orientation "A" is successively followed by a stator lamination aligned in a second orientation "B" (e.g., where the second orientation corresponds to a 180 degree shift of the first orientation). Thus, in some implementations, an "A B A B A B . . . " pattern is created for the orientations of successive laminations.

In some implementations, periodically varying the rotational orientations includes alternating the rotational orientations of successive groups of stator laminations in the sequence by 180 degrees, wherein the rotational orientations of the stator laminations in each group are identical. In some implementations, the successive groups are successive pairs. In some implementations, the rotational orientations of the two stator laminations in each pair are identical. For example, a first group of stator laminations corresponding to a plurality of stator laminations aligned in the first orientation "A" is successively followed by a second group of stator laminations corresponding to a plurality of stator laminations aligned in a second orientation "B." For example, if the first group of stator laminations aligned in the first orientation "A" includes three stator laminations and the second group of stator laminations aligned in the second orientation "B" includes three stator laminations, an "A A A B B B A A A B B B . . . " pattern may be formed. It is to be understood that the number of stator laminations in each successive group may vary. Each respective group of the successive groups may (e.g., or may not) have the same number of laminations in the group.

Figure 4:
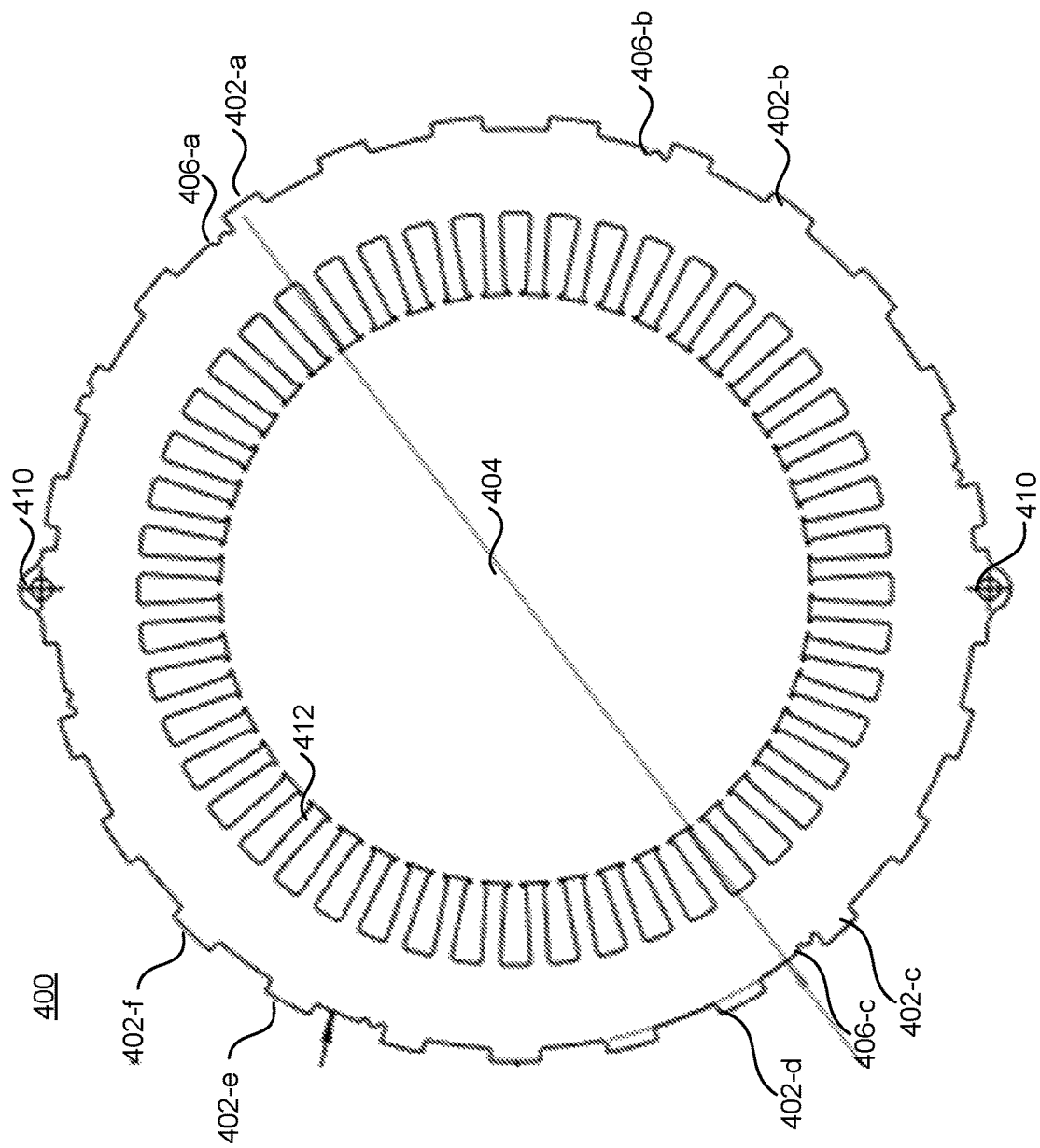
FIG. 4 illustrates a stator lamination pattern with fins, in accordance with some implementations.

FIG. 4 illustrates a perspective view of a stator lamination pattern having fins, in accordance with some implementations. In some implementations, the stator lamination pattern (e.g., stator lamination pattern 400) includes a plurality of fins 402 (e.g., including fin 402-a, fin 402-b, fin 402-c, fin 402-d, fin 402-e, and fin 402-f) (the additional fins shown in FIG. 4 are not labeled) along the circumference of the stator lamination pattern. In some implementations, the plurality of fins 402 are arranged on the outer circumference of the stator lamination pattern and the fins are equally spaced. In some implementations, the fins allows for better cooling than a stator lamination pattern without fins by increasing the surface area (e.g., for oil to travel on) between successive stator laminations in the stack.

In some implementations, the stator lamination pattern 400 includes weld points 406 (e.g., including weld points 406-a, 406-b, and 406-c). In some implementations, the weld points 406 of the stator laminations in the sequence align regardless of the rotational orientations during the stacking. In some implementations, at least one of the weld points may overlap with a fin.

In some implementations, the stator lamination pattern 400 includes a first opening 410 and a second opening 410. In some implementations, the first opening 410 (e.g., and/or the second opening 410) is in a respective fin. In some implementations, the first opening 410 and the second opening 410 are rotationally situated 180 degrees apart. In some implementations, the first opening 410 and the second opening 410 are used as guide holes to align and/or rotate a plurality of stator laminations (e.g., or groups of stator laminations). For example, successive stator laminations (or successive groups of stator laminations) may be rotated (e.g., by 180 degrees) by matching the first opening of a first stator lamination (or first group of laminations) with a second opening of a second stator lamination (or second group of laminations). In some implementations, the stator lamination pattern 400 may include more than two openings (e.g., a third opening, a fourth opening, etc.) used to align the plurality of stator laminations. Additional openings (e.g., in addition to the first opening and the second opening) may allow the plurality of stator laminations to be rotated by less than 180 degrees.

In some implementations, first opening 410 includes an inlet for oil to enter and second opening 410 includes an outlet for oil to escape. In some implementations, first opening 410 includes an outlet and second opening 410 includes an inlet. In some implementations, first opening 410 and second opening 410 perform the same functions as first opening 710 and second opening 710, respectively, as described below with respect to FIG. 7.

Figure 5:
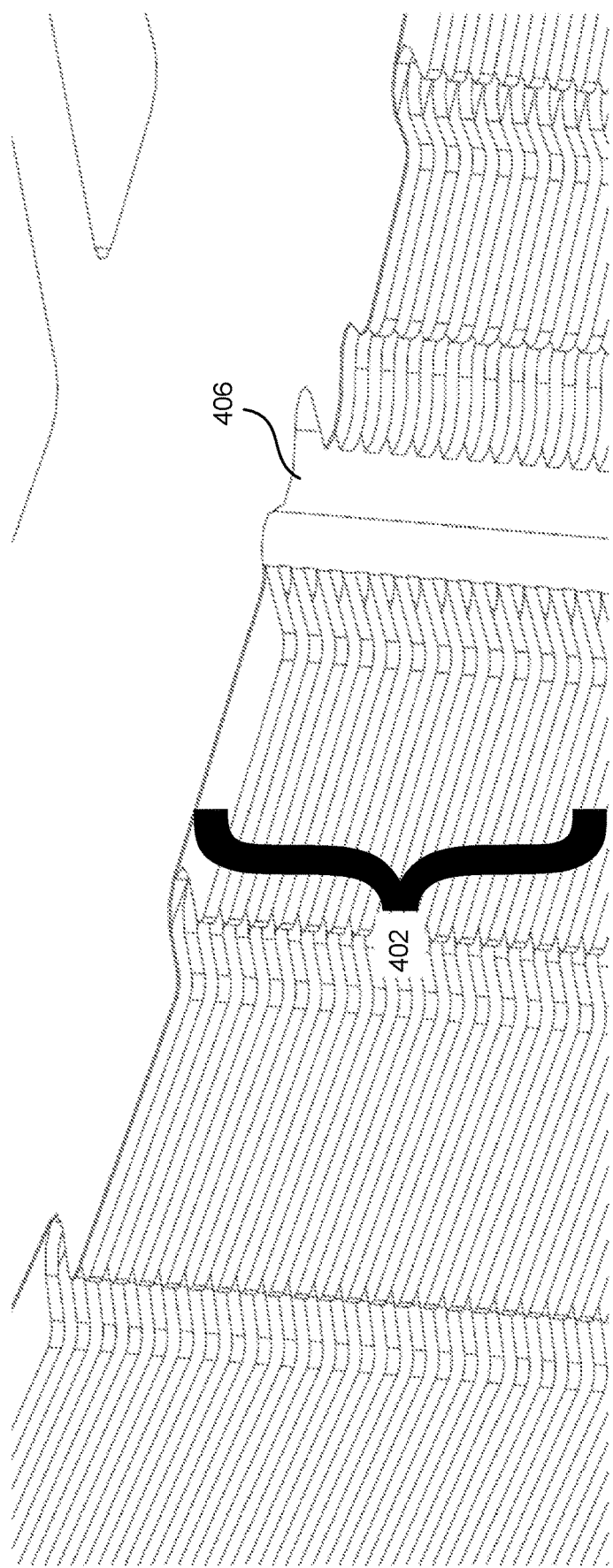
FIG. 5 is a partial perspective view of stacked stator laminations with fins, in accordance with some implementations.

FIG. 5 is a partial side view of a plurality of stacked stator laminations with fins. The method of fabricating the stator (e.g., stator 1408) further includes stacking the plurality of stator laminations in a sequence along an axis. For example, in FIG. 4, the axis is along the z-plane traveling through the lamination. In some implementations, the centers of respective stator laminations in the stack of the plurality of stator laminations are aligned.

The stacking of the plurality of stator laminations includes periodically varying rotational orientations of the stator laminations in the sequence, the rotational orientations being defined with respect to the axis. As shown in FIG. 5, the fins 402 of each successive stator lamination (e.g., or group of stator laminations) do not align. This results in the gaps, shown in FIG. 5, between stator lamination fins. The weld points 406 of each successive stator lamination (e.g., or group of stator laminations) are aligned (e.g., including weld points 406-a, 406-b, 406-c) regardless of the rotational orientation of the respective stator lamination (e.g., with respect to the axis).

In some implementations, periodically varying the rotational orientations includes alternating the rotational orientations of stator laminations in the sequence by 180 degrees. In some implementations, respective fins are situated directly opposite to respective portions of the circumference that do not include fins. For example, as shown by line 404 of FIG. 4, fin 402-a is situated directly opposite to a portion of the circumference that does not include fins (e.g., the portion of the circumference between fins 402-c and 402-d). The stator lamination pattern in FIG. 4 also shows that fin 402-b is situated directly opposite to a portion of the circumference that does not include fins (e.g., the portion of the circumference between fins 402-e and 402-f). Therefore, when the rotational orientation of a second stator lamination is shifted (e.g., alternated) by 180 degrees with respect to the rotational orientation of a first stator lamination, the fins of the second stator lamination do not directly align with the fins of the first stator lamination when stacked (e.g., with the stator lamination centers aligned). In some implementations, the fins of successive stator laminations (e.g., or stator lamination groups) do not overlap. For example, as shown in FIG. 6, there is a gap 602, between a first fin 402-a, of a first stator lamination, and a second fin 402-b, of a second stator lamination (e.g., where the second stator lamination is stacked behind the first stator lamination and the fins of the first and second stator laminations do not overlap).

Figure 6:
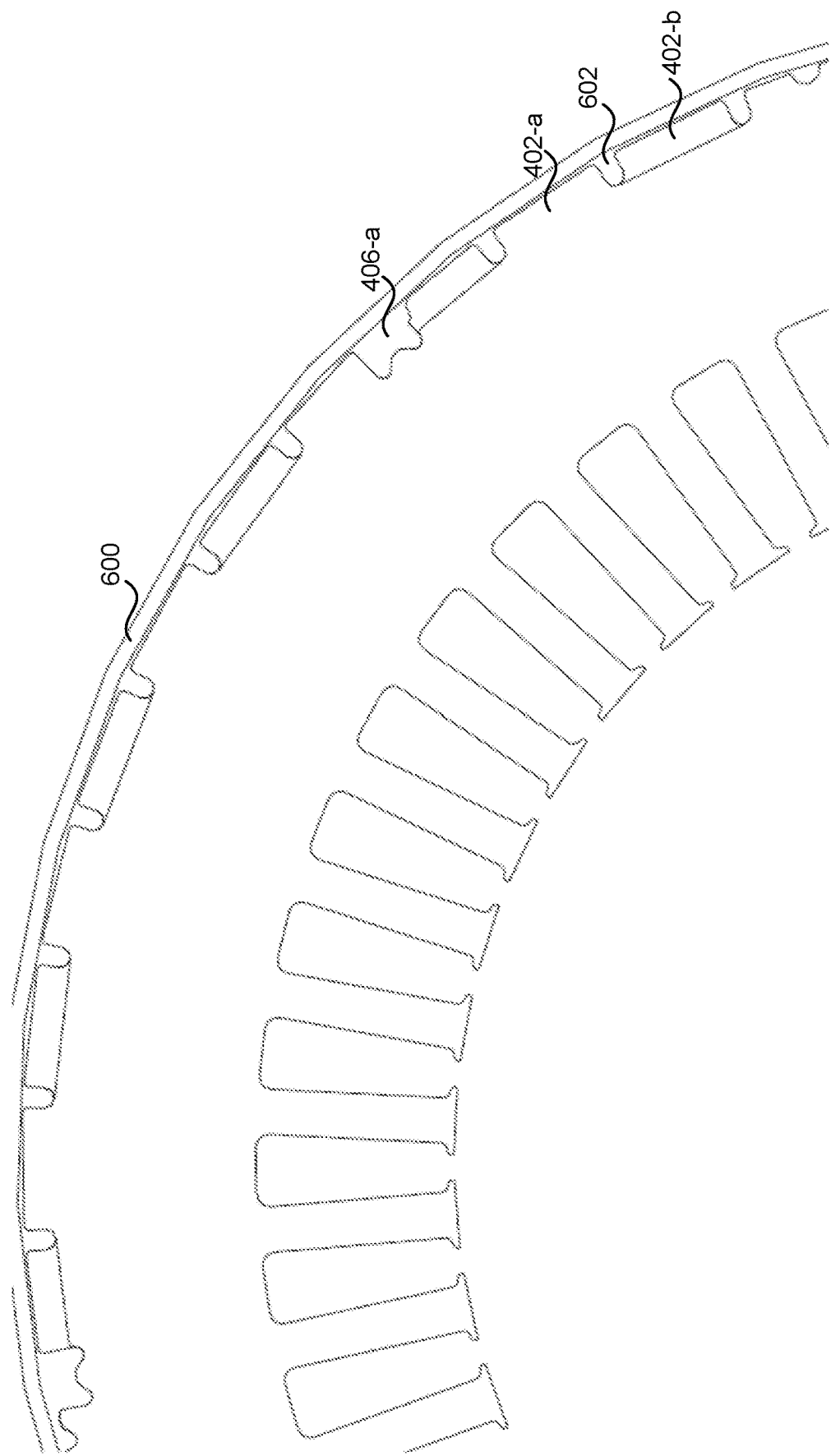
FIG. 6 is a partial view of a plurality of stator laminations with a manifold, in accordance with some implementations.

FIG. 6 illustrates a partial view of at least two stator laminations having fins, the two stator laminations stacked, including a first stator lamination having a first rotational orientation and a second stator lamination having a second rotational orientation (e.g., shifted by 180 degrees). For example, the first stator lamination appears in front of the second lamination, which is stacked such that the centers of the two stator laminations align.

In some implementations, a manifold 600 wraps around the circumference of the stacked stator laminations. Manifold 600 may be used to force a substance (e.g., a fluid such as oil) to pass between fins 402 of the plurality of stator laminations. In some implementations, the manifold is a sealed manifold around the stator to create a closed oil loop. In some implementations, manifold 600 is made of plastic or metal. In some implementations, oil (e.g., or another substance) may be dripped onto the outside of stator 1408 such that the oil travels between fins 402 of the plurality of stator laminations (e.g., without a manifold). In some implementations, the oil travels between gaps 602.

Figure 7:
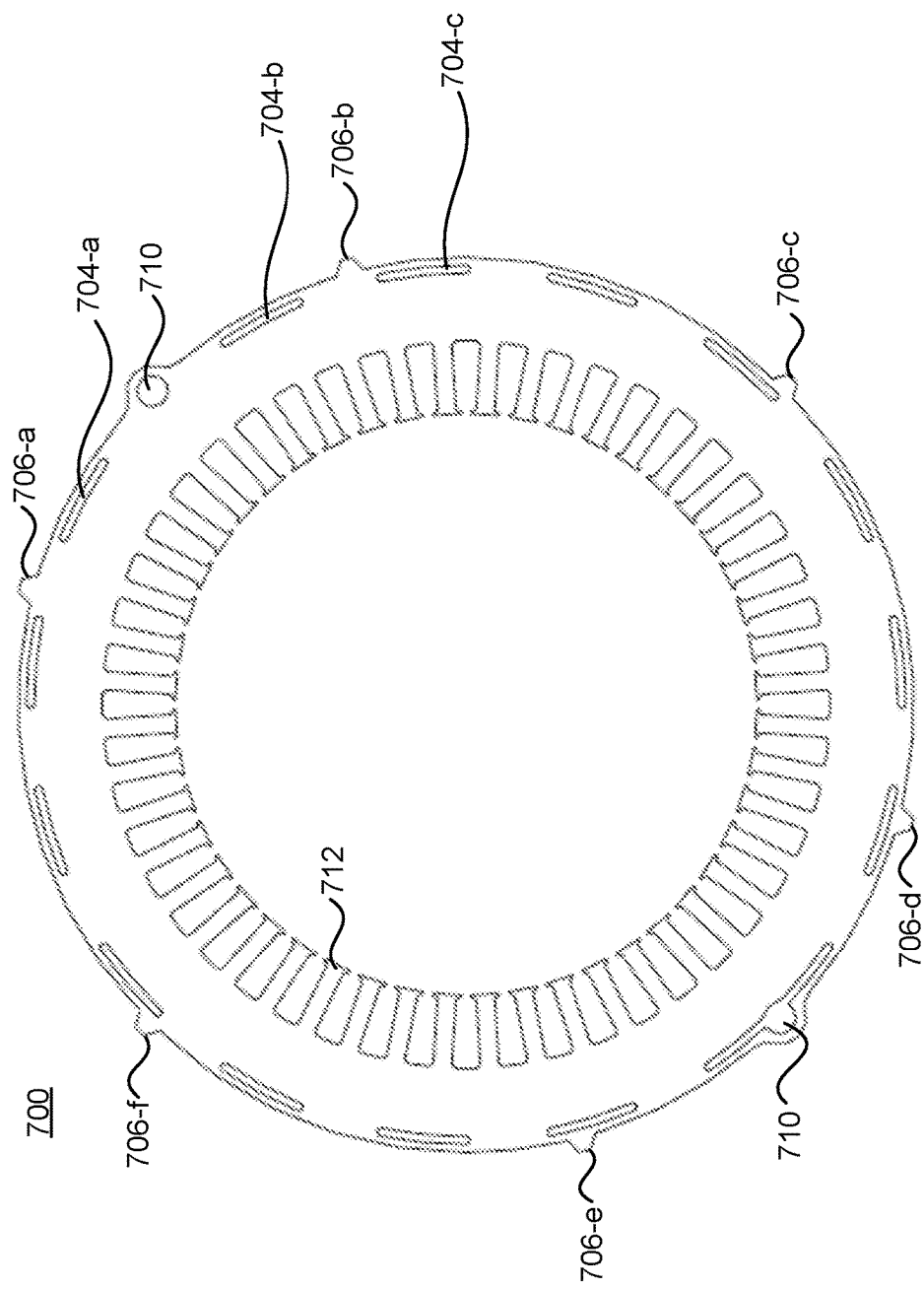
FIG. 7 illustrates a stator lamination pattern with apertures, in accordance with some implementations.

FIG. 7 illustrates a perspective view of a stator lamination pattern with apertures, in accordance with some implementations. In some implementations, the stator lamination pattern 700 includes a series of apertures 704 (e.g., including aperture 704-a, aperture 704-b, aperture 704-c) situated circumferentially around the stator lamination pattern. The apertures of adjacent (e.g., successive) stator laminations (e.g., in the stack of stator laminations) with varying rotational orientations in the sequence align to form channels. For example, as the rotational orientations of the stator laminations change while stacking the plurality of stator laminations, the apertures of adjacent stator laminations in the stack align, at least in part, to create channels that would allow a substance (e.g., a fluid such as oil) to flow through the channels (e.g., and travel over the complete surface area). In some implementations, a greater number of stator laminations in each successive group corresponds with the creation of a larger channel. In some implementations, the channels are sealed oil channels.

In some implementations, the stator lamination pattern 700 includes weld points 706 (e.g., including weld points 706-a, 706-b, and 706-c). In some implementations, the weld points 706 align regardless of the rotational orientations during the stacking. For example, while the apertures of adjacent stator laminations do not directly align (e.g., but only partially overlap), the weld points 706 of adjacent stator laminations align despite the change in rotational orientations between adjacent stator laminations.

In some implementations, the stator lamination pattern 700 includes a first opening 710 and a second opening 710. In some implementations, the first opening 710 is in a respective aperture of the series of apertures 704. In some implementations, the second opening 710 is separate from the series of apertures 704. In some implementations, the channels (e.g., created by the apertures of adjacent stator laminations) connect the first opening 710 (e.g., of a first stator lamination in the stack) with the second opening 710 (e.g., of a second stator lamination in the stack). In some implementations, the first opening 710 and the second opening 710 are rotationally situated 180 degrees apart.

Figure 8:
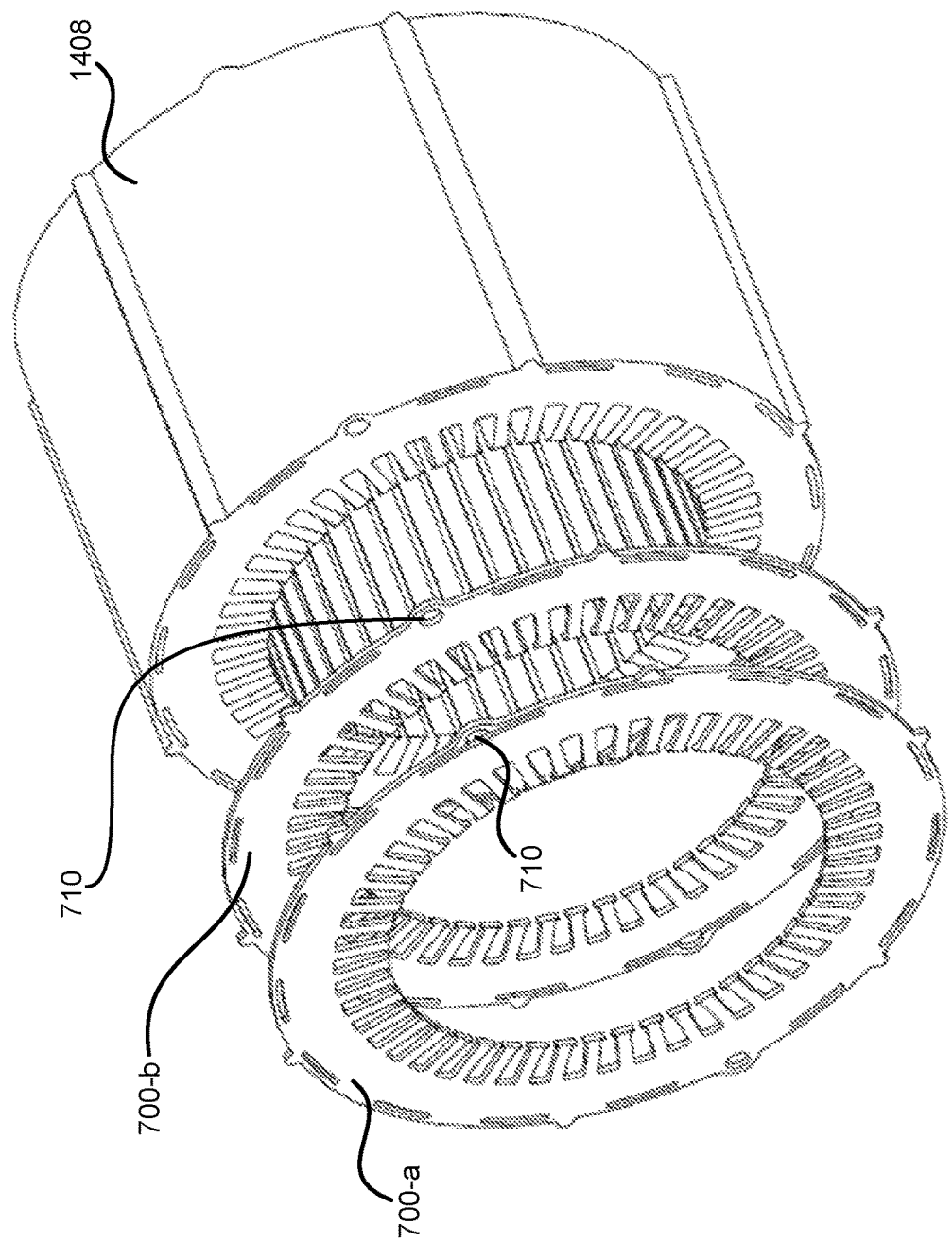
FIG. 8 illustrates a plurality of stacked stator laminations with apertures, in accordance with some implementations.

FIG. 8 illustrates a plurality of stacked stator laminations (e.g., including stator laminations 700-a and 700-b based on the stator lamination pattern 700) in a sequence along an axis (e.g., an axis that is coaxial with a rotational axis of a rotor, FIG. 1). Each stator lamination 700 of the plurality of stator laminations is a copy of the same stator lamination pattern. The stacking includes periodically varying rotational orientations of the stator laminations in the sequence. In some implementations, the rotational orientations are defined with respect to the axis (e.g., the rotations are periodically varied by rotating the stator laminations, relative to one another, with respect to the axis). In some implementations, the rotational orientations are defined with respect to an axis in the plane of the stator laminations (e.g., the stator laminations are flipped over relative to one another).

Figure 9:
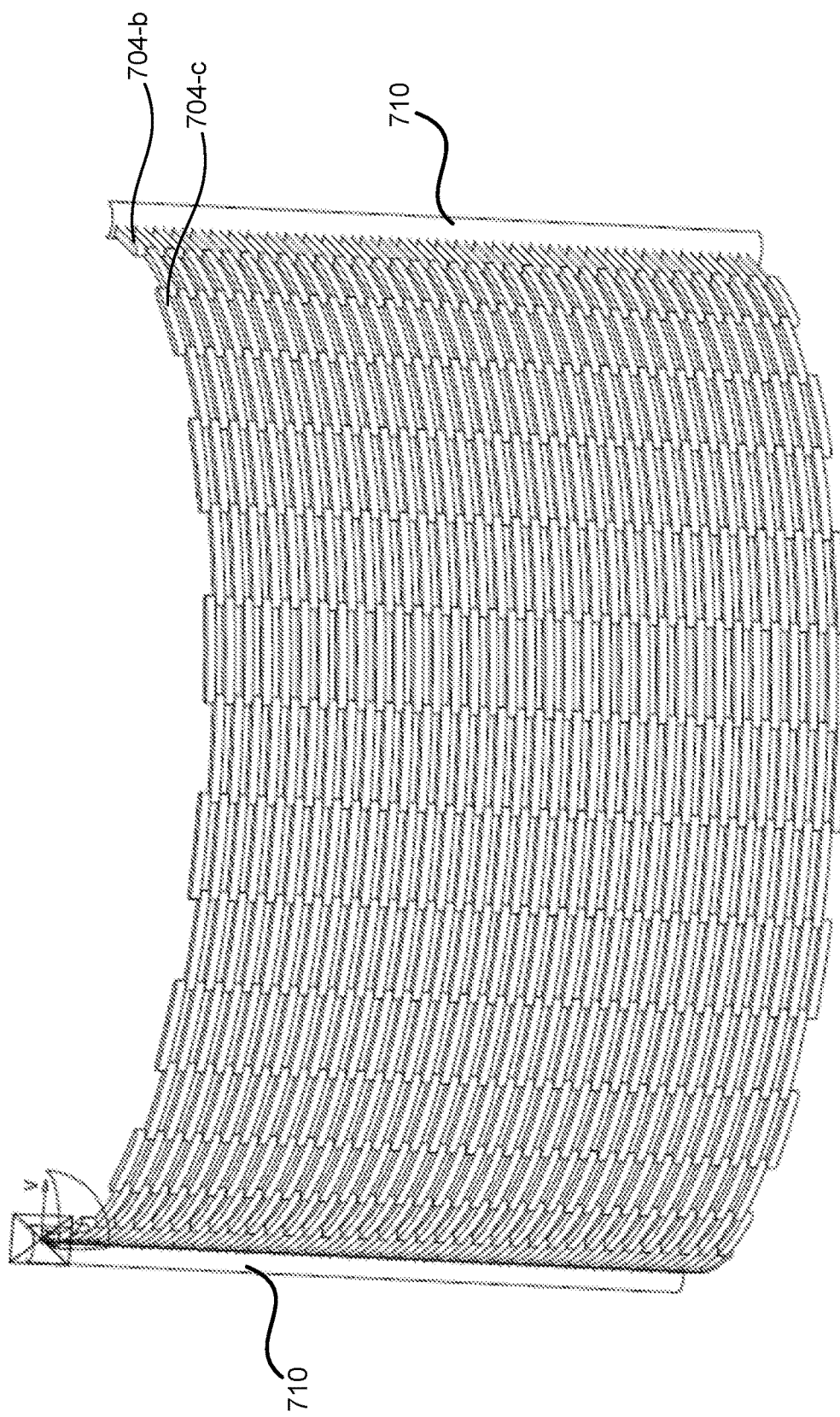
FIG. 9 is a cut-away perspective diagram illustrating stacked stator laminations with apertures, in accordance with some implementations.

FIG. 9 is a negative-space representation of the stacked plurality of stator laminations. As shown in the figure, the apertures 704 (e.g., including apertures 704-b and 704-c) create channels that connect the first opening 710 with the second opening 710. For example, the channels (e.g., apertures) are shown as solid blocks (because FIG. 9 is a negative space representation). In some implementations, the stack of the stator laminations also forms regions in which a cooling fluid is forced against (e.g., applied to or incident upon) portions of respective faces of the stator laminations. In some implementations, the regions in which the cooling fluid is forced against the portions of the respective faces of the stator laminations are disposed between adjacent channels (e.g., a region in which the cooling fluid is forced against a portion of a respective face is connected to a channel on each side of the region).

In some implementations, the stacking includes using the first opening 710 and the second opening 710 as guide holes.

For example, in FIG. 8, two successive stator laminations, 700-a and 700-b (e.g., each stator lamination having the stator lamination pattern 700 shown in FIG. 7), are illustrated as being rotated in the sequence by 180 degrees. The first opening 710 (e.g., within an aperture) of stator lamination 700-a is aligned with the second opening 710 (e.g., not within an aperture) of stator lamination 700-b. The stator laminations 700-a and 700-b are stacked over a plurality of additional stator laminations, each additional stator lamination also having the stator lamination pattern 700.

In some implementations, the stator fabricated by stacking a plurality of stators having the stator lamination pattern 700 allows for cooling of the drive unit regardless of the drive unit rotation (e.g., angled positioning), as described above with reference to FIG. 1B. In some implementations, an oil loop is created to allow oil to travel in both directions around the stator.

In some implementations, a manifold is disposed on the outside of the stack of stator laminations, as described as manifold 600 with respect to FIG. 6. In some implementations, the manifold pushes (e.g., contains) the fluid (e.g., oil) in the stack of stator laminations. In some implementations, oil (e.g., or another substance) may be dripped onto an inlet (e.g., an oil pump inlet), such as the first opening 710 (e.g., or second opening 710) such that the oil travels, through the channels, in both directions (e.g., clockwise and counterclockwise) across the surface area of the stator lamination and flows out of an outlet, such as the second opening 710 (e.g., or first opening 710). In some implementations, an oil pump (e.g., oil pump 1430 of FIG. 1B) is located in a lower corner of casting 1400. In some implementations, the location of the oil pump inlet allows for an oil loop to be created regardless of the angle of installation. For example, by allowing the oil to travel both directions through the channels of the stator, the same drive unit (e.g., casting 1400) may be used in both the front and the rear of a vehicle despite having different mounting angles, while maintaining the cooling of the drive unit.

In some implementations, the method of fabricating the stator further includes joining the plurality of stator laminations as stacked in the sequence. In some implementations, the joining includes welding the plurality of stator laminations together at least one of the weld points (e.g., weld points 406 or weld points 706). In some implementations, joining the plurality of stator laminations includes welding the plurality of stator laminations together at multiple weld points 406 (e.g., or weld points 706) along the circumferences of the stator laminations. In some implementations, as explained above with respect to weld points 406 and 706, the weld points of the stator laminations align regardless of the rotational orientations during the stacking.

In some implementations, joining the plurality of stator laminations includes connecting the plurality of stator laminations using epoxy. It will be understood that other joining agents may be used to join the plurality of stator laminations as stacked in the sequence.

It should be noted that the stators described herein may include additional stator laminations that are manufactured using the same pattern as the other stator laminations. For example, the phrase "each stator lamination of the plurality of stator laminations is a copy of the same stator lamination pattern" does not imply the absence of additional stator laminations that are not a copy of the same stator lamination pattern. Instead, the phrase means that there are at least two stator laminations that are a copy of the same stator lamination pattern.

It will also be understood that, although the terms first, second, etc. are, in some instances, used herein to describe various elements, these elements should not be limited by these terms. These terms are only used to distinguish one element from another. For example, a first stator lamination could be termed a second stator lamination, and, similarly, a second stator lamination could be termed a first stator lamination, without departing from the scope of the various described implementations. The first stator lamination and the second stator lamination are both stator laminations, but they are not the same stator lamination unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of fabricating a stator for an electric motor, comprising:
   providing a plurality of stator laminations, wherein each stator lamination of the plurality of stator laminations is a copy of the same stator lamination pattern, wherein:
      the stator lamination pattern comprises a series of apertures situated circumferentially around the stator lamination pattern, the series of apertures comprising axially elongated openings along the outer circumference of the stator lamination,
      the axially elongated openings are arranged in the series to be radially asymmetric, wherein a center of a first aperture is situated along the outer circumference directly opposite to a portion of the outer circumference that does not include an aperture, and the axially elongated openings, when stacked, at least partially overlap;
   stacking the plurality of stator laminations in a sequence along an axis, comprising periodically varying rotational orientations of the stator laminations in the sequence; and
   joining the plurality of stator laminations as stacked in the sequence.

2. The method of claim 1, wherein the rotational orientations are defined with respect to the axis.

3. The method of claim 1, wherein periodically varying the rotational orientations of the stator laminations in the sequence comprises flipping the stator laminations by 180 degrees.

4. The method of claim 1, wherein periodically varying the rotational orientations comprises alternating the rotational orientations of successive stator laminations in the sequence by 180 degrees.

5. The method of claim 1, wherein periodically varying the rotational orientations comprises alternating the rotational orientations of successive groups of stator laminations in the sequence by 180 degrees, wherein the rotational orientations of the stator laminations in each group are identical.

6. The method of claim 5, wherein the successive groups comprise successive pairs, wherein the rotational orientations of the two stator laminations in each pair are identical.

7. The method of claim 1, wherein:
   the apertures of adjacent stator laminations with varying rotational orientations in the sequence align to form channels.

8. The method of claim 7, wherein:
   the stator lamination pattern comprises a first opening and a second opening, the first opening being in a respective aperture of the series of apertures; the second opening being separate from the series of apertures; and
   the channels connect the first opening with the second opening when the plurality of stator laminations is stacked in the sequence.

9. The method of claim 8, wherein the stacking comprises using the first opening and the second opening as guide holes.

10. The method of claim 1, wherein joining the plurality of stator laminations comprises welding the plurality of stator laminations together at multiple weld points along a circumferences of the stator laminations.

11. The method of claim 1, wherein joining the plurality of stator laminations comprises connecting the plurality of stator laminations using epoxy.

12. An electric motor, comprising:
   a rotor having a rotor shaft disposed along an axis of the rotor; and
   a stator that includes a plurality of stator laminations stacked coaxially with the rotor shaft in a sequence, wherein:
      each stator lamination of the plurality of stator laminations is a copy of the same stator lamination pattern, wherein:
      the stator lamination pattern comprises a series of apertures situated circumferentially around the stator lamination pattern, the series of apertures comprising axially elongated openings along the outer circumference of the stator lamination,
      the axially elongated openings are arranged in the series to be radially asymmetric, wherein a center of a first aperture is situated along the outer circumference directly opposite to a portion of the outer circumference that does not include an aperture, and the axially elongated openings, when stacked, at least partially overlap; and the stator laminations have periodically varying rotational orientations of the stator laminations in the sequence.

13. The electric motor of claim 12, wherein:

the apertures of adjacent stator laminations with varying rotational orientations in the sequence overlap to form channels.

14. The electric motor of claim 12, wherein a first lamination has a rotational orientation that is flipped with respect to a rotational orientation of a second lamination.

15. The electric motor of claim 12, wherein a first lamination has a rotational orientation that is rotated 180 degrees about the axis relative to a second lamination.

16. The electric motor of claim 12, wherein the stacking of the stator laminations forms channels as wells as regions in which a cooling fluid is forced against portions of respective faces of the stator laminations.

* * * * *